(12) United States Patent
  Park et al.

(10) Patent No.: US 12,646,232 B2
(45) Date of Patent: Jun. 2, 2026

(54) TEMPORALLY CONSISTENT AND SEMANTICS GUIDED TEXT-BASED VIDEO EDITING GENERATIVE ARTIFICIAL INTELLIGENCE (AI) MODEL WITH IMPROVED INITIALIZATION

(71) Applicant: QUALCOMM Incorporated, San Diego, CA (US)

(72) Inventors: Hyojin Park, San Diego, CA (US); Debasmit Das, San Diego, CA (US); Munawar Hayat, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 18/434,606

(22) Filed: Feb. 6, 2024

(65) Prior Publication Data

US 2025/0252627 A1    Aug. 7, 2025

(51) Int. Cl.
  *G06T 11/60*        (2026.01)
  *G06F 40/40*        (2020.01)
  *G06T 5/60*         (2024.01)
  *G06T 5/70*         (2024.01)
  *G06V 20/40*        (2022.01)
  *G06V 20/70*        (2022.01)

(52) U.S. Cl.
  CPC .............. *G06T 11/60* (2013.01); *G06T 5/60* (2024.01); *G06T 5/70* (2024.01); *G06V 20/46* (2022.01); *G06V 20/70* (2022.01); *G06F 40/40*

(2020.01); *G06T 2207/10016* (2013.01); *G06T 2207/20081* (2013.01); *G06T 2207/20084* (2013.01)

(58) Field of Classification Search
  CPC ... G06T 11/60; G06T 5/60; G06T 5/70; G06T 2207/10016; G06T 2207/20081; G06T 2207/20084; G06V 20/46; G06V 20/70; G06V 20/40; G06V 10/82; G06F 40/40; G06F 2218/04
  See application file for complete search history.

(56) References Cited

U.S. PATENT DOCUMENTS

2024/0169622 A1*  5/2024  Xie .......................... G06T 11/00

OTHER PUBLICATIONS

Huang N., et al., "Style-A-Video: Agile Diffusion for Arbitrary Text-based Video Style Transfer", arXiv: 2305.05464v1 [cs.CV], Cornell University Library, 201 Olin Library Cornell University Ithaca, NY 14853, May 9, 2023, 9 pages.
International Search Report and Written Opinion—PCT/US2024/058287—ISA/EPO—Mar. 12, 2025.
(Continued)

*Primary Examiner* — Grace Q Li
(74) *Attorney, Agent, or Firm* — Seyfarth Shaw LLP

(57) ABSTRACT

A processor-implemented method performed for text-based video editing includes receiving a video input and a text prompt. The video input includes a sequence of video frames. Features of the video input are extracted to generate a latent representation of the video input. Noise is injected to the latent representation of the video input to generate a noise injected latent. The noise is conditioned on the video input. An artificial neural network (ANN) model processes the noise injected latent based on the text prompt to adapt the video input according to the text prompt.

17 Claims, 13 Drawing Sheets

(56) References Cited

OTHER PUBLICATIONS

Wu J Z., et al., "Tune-A-Video: One-Shot Tuning of Image Diffusion Models for Text-to-Video Generation", 2023 IEEE/CVF International Conference on Computer Vision (ICCV), IEEE, Oct. 2023, pp. 7589-7599.

* cited by examiner

100

102 — CPU

104 — GPU

106 — DSP

108 — NPU

110 — CONNECTIVITY

112 — MULTIMEDIA

114 — SENSORS

116 — ISPs

118 — MEMORY

120 — NAVIGATION

202

FULLY CONNECTED

204

LOCALLY CONNECTED

210

212

214

216

206

CONVOLUTIONAL

208

350

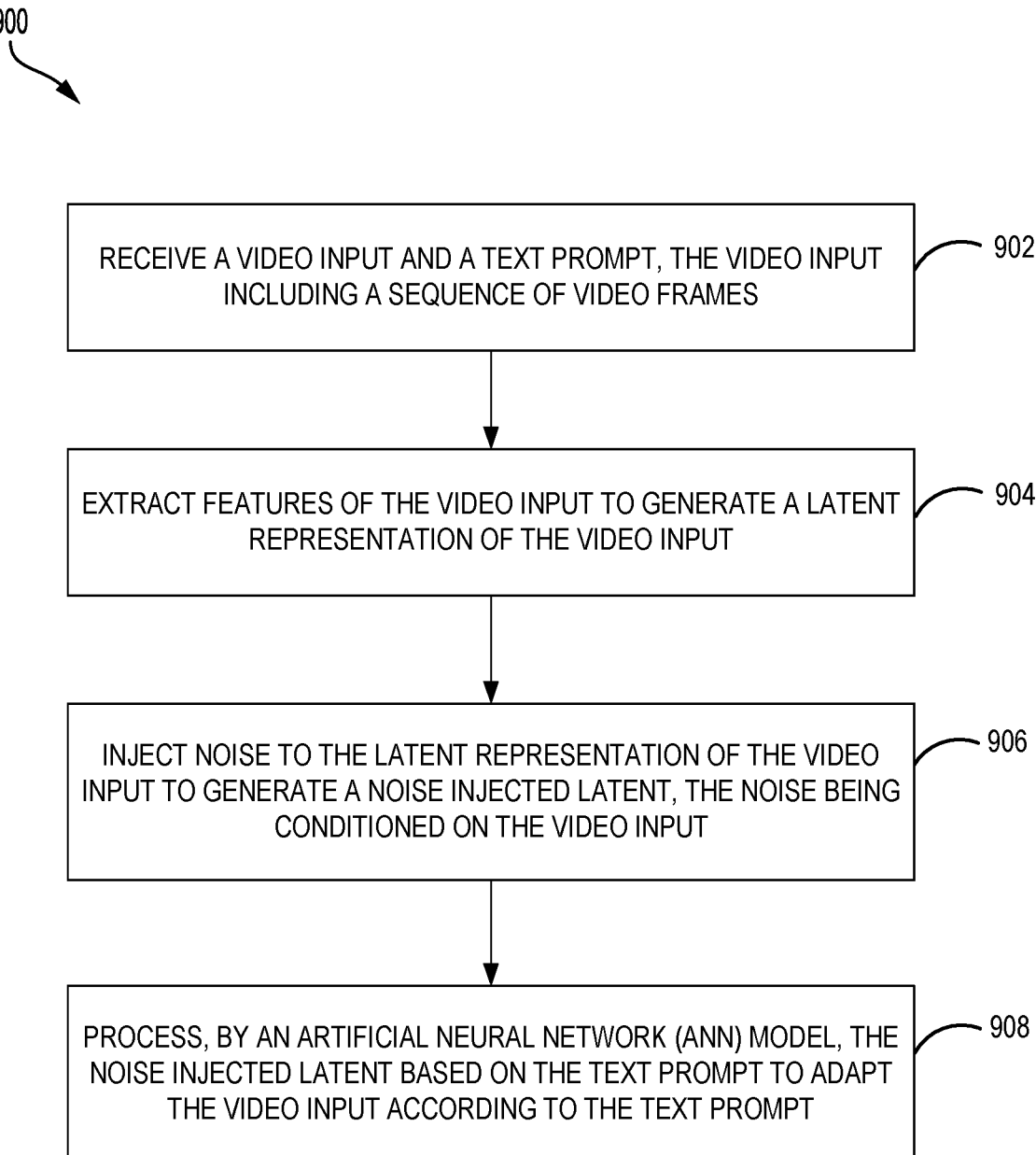

900

RECEIVE A VIDEO INPUT AND A TEXT PROMPT, THE VIDEO INPUT INCLUDING A SEQUENCE OF VIDEO FRAMES — 902

EXTRACT FEATURES OF THE VIDEO INPUT TO GENERATE A LATENT REPRESENTATION OF THE VIDEO INPUT — 904

INJECT NOISE TO THE LATENT REPRESENTATION OF THE VIDEO INPUT TO GENERATE A NOISE INJECTED LATENT, THE NOISE BEING CONDITIONED ON THE VIDEO INPUT — 906

PROCESS, BY AN ARTIFICIAL NEURAL NETWORK (ANN) MODEL, THE NOISE INJECTED LATENT BASED ON THE TEXT PROMPT TO ADAPT THE VIDEO INPUT ACCORDING TO THE TEXT PROMPT — 908

*FIG. 9*

TEMPORALLY CONSISTENT AND SEMANTICS GUIDED TEXT-BASED VIDEO EDITING GENERATIVE ARTIFICIAL INTELLIGENCE (AI) MODEL WITH IMPROVED INITIALIZATION

FIELD OF THE DISCLOSURE

Aspects of the present disclosure generally relate to artificial intelligence, and more specifically to a temporally consistent and semantics guided text-based video editing generative artificial intelligence (AI) model with improved initialization.

BACKGROUND

Artificial neural networks may comprise interconnected groups of artificial neurons (e.g., neuron models). The artificial neural network (ANN) may be a computational device or be represented as a method to be performed by a computational device. Convolutional neural networks (CNNs) are a type of feed-forward ANN. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Text-to-video models may take text as an input, and an optional guidance, to produce a desired edited video. The guidance may be a pose, edges, another video, or other types of guidance. The guidance may enable improved control over the generated video and may preserve the structure and content of a given scene. For conventional video editing, guidance may have to be another video.

Many conventional video editing approaches may also use fine-tuning or test-time training on the input video. However, edge devices may have limited computational resources. As such, the edge devices may conduct inferencing, but may not have the capacity for on-device learning or backpropagation.

SUMMARY

The present disclosure is set forth in the independent claims, respectively. Some aspects of the disclosure are described in the dependent claims.

In some aspects of the present disclosure, a processor-implemented method includes receiving a video input and a text prompt. The video input includes a sequence of video frames. The processor-implemented method also includes extracting features of the video input to generate a latent representation of the video input. The processor-implemented method additionally includes injecting noise to the latent representation of the video input to generate a noise injected latent. The noise is conditioned on the video input. The processor-implemented method further includes processing, by an artificial neural network (ANN) model, the noise injected latent based on the text prompt to adapt the video input according to the text prompt.

Various aspects of the present disclosure are directed to an apparatus including means for receiving a video input and a text prompt. The video input includes a sequence of video frames. The apparatus also includes means for extracting features of the video input to generate a latent representation of the video input. The apparatus additionally includes means for injecting noise to the latent representation of the video input to generate a noise injected latent. The noise is conditioned on the video input. The apparatus further includes means for processing, by an artificial neural network (ANN) model, the noise injected latent based on the text prompt to adapt the video input according to the text prompt.

Various aspects of the present disclosure are directed to an apparatus having at least one memory and one or more processors coupled to the at least one memory. The processor(s) is configured to receive a video input and a text prompt. The video input includes a sequence of video frames. The processor(s) is also configured to extract features of the video input to generate a latent representation of the video input. The processor(s) is additionally configured to inject noise to the latent representation of the video input to generate a noise injected latent. The noise is conditioned on the video input. The processor(s) is further configured to process, by an artificial neural network (ANN) model, the noise injected latent based on the text prompt to adapt the video input according to the text prompt.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 9 is a flow diagram illustrating a processor-implemented method for text-based video editing, in accordance with various aspects of the present disclosure.

DETAILED DESCRIPTION

Figure 1:
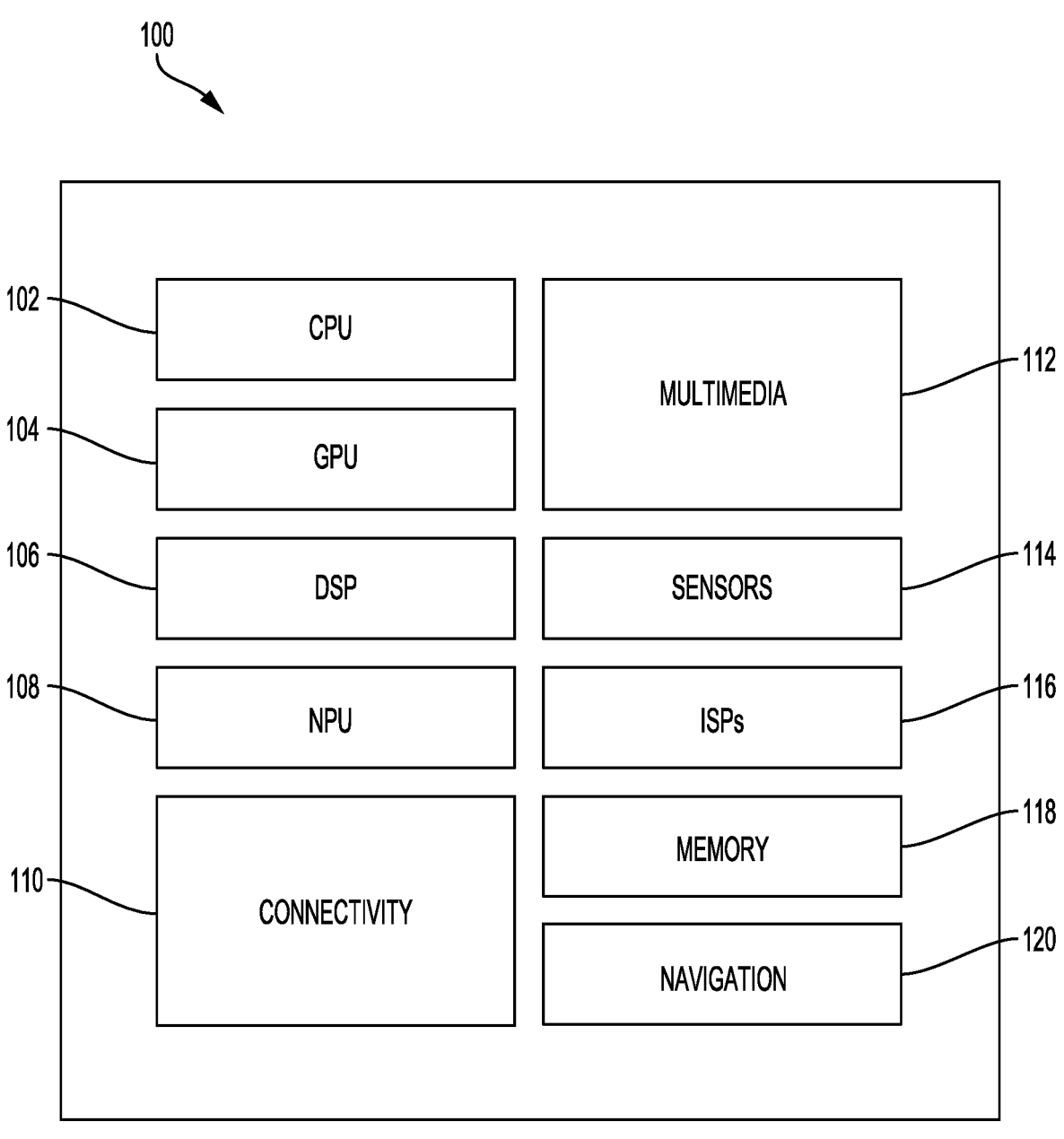
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, text-to-video models may take text as an input, and an optional guidance, to produce a desired edited video. The guidance may be a pose, edges, another video, or other types of guidance. The guidance may enable improved control over the generated video and may preserve the structure and content of a given scene. For conventional video editing, guidance may be another video.

Many conventional video editing approaches may also use fine-tuning or test-time training on the input video. However, edge devices may have limited computational resources. As such, the edge devices may conduct inferencing but may not have the capacity for on-device learning or backpropagation.

The conventional inference-only techniques may attempt to convert an image-based model into a video-based model by reprogramming self-attention into cross-attention across all frames to improve temporal consistency. However, doing so may be computationally inefficient, considering the length of the video or number of frames. Moreover, such conventional approaches may not consider additional structural guidance and may suffer from inconsistent semantic structure (e.g., an oddly shaped object or a person depicted with one eye or three eyes) compared to an original video.

Accordingly, to address these and other challenges, aspects of the present disclosure are directed to text-based video editing using a generative model for temporal consistency. In various aspects, the text-based video editing may be guided using semantic information.

Particular aspects of the subject matter described in this disclosure can be implemented to realize one or more of the following potential advantages. In some examples, the described techniques such as the injecting input conditioned noise and the semantic-guided video generation may increase temporal consistency in the edited video and reduce the computational complexity and model latency.

In addition, aspects of the present disclosure may have application in areas such as autonomous vehicles or advanced driver assistance systems (ADAS), extended reality (XR) and image processing. Perception models may be trained using real datasets or simulated game datasets in urban settings. Collecting data for rarely occurring situations is challenging but may be important to enable perception systems to generalize to different conditions. In various aspects of the present disclosure, video data generation may be enabled across multiple desirable scenarios, thus enabling generalization to real world scenes, across a variety of road conditions. A perception system trained with such rich data may enable vehicles to take appropriate control actions, including, for example, velocity control, steering, and/or braking. By editing the captured videos, based on text prompts such as 'make it night,' 'introduce rain or fog artifacts,' or the like, for example (but not limitation), diverse videos may be generated for training that can enhance the capability of the perception systems.

For virtual reality, videos of a current scene may be captured and edited to transform the virtual environment. For example, a virtual environment with a desert terrain may be transformed into a grassland or snowy terrain. Thus, aspects of the present disclosure may enable development of new environments for the gameplay, education, training, or other purposes, for instance.

Furthermore, text based video editing may enhance camera features. For example, aspects of the present disclosure may enable content editing of videos captured using the camera. For example, a captured video may be edited before being shared. Additionally, user personalization may be carried out to inject personal effects into a video.

Certain aspects and techniques as described herein may be implemented, at least in part, using an artificial intelligence (AI) program, such as a program that includes a machine learning (ML) or artificial neural network (ANN) model. An example ML model may include mathematical representations or define computing capabilities for making inferences from input data based on patterns or relationships identified in the input data. As used herein, the term "inferences" can include one or more of decisions, predictions, determinations, or values, which may represent outputs of the ML model. The computing capabilities may be defined in terms of certain parameters of the ML model, such as weights and biases. Weights may indicate relationships between certain input data and certain outputs of the ML model, and biases may represent offsets which may indicate a starting point for outputs of the ML model. An example ML model, operating on input data, may start at an initial output based on the biases and then update its output based on a combination of the input data and the weights.

ML models may be characterized in terms of types of learning that generate specific types of learned models that perform specific types of tasks. For example, different types of machine learning include supervised learning, unsupervised learning, semi-supervised learning, reinforcement learning, etc. ML models may be used to perform different tasks such as classification or regression, where classification refers to determining one or more discrete output values from a set of predefined output values, and regression refers to determining continuous values which are not bounded by predefined output values. Some example ML models configured for performing such tasks include ANNs such as convolutional neural networks (CNNs) and recurrent neural networks (RNNs), transformers, diffusion models, regression analysis models (such as statistical models), large language models (LLMs), decision tree learning (such as predictive models), support vector networks (SVMs), and probabilistic graphical models (such as a Bayesian network), etc.

FIG. 1 illustrates an example implementation of a system-on-a-chip (SOC) 100, which may include a central processing unit (CPU) 102 or a multi-core CPU configured for text-based video editing. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM, RISC-V (RISC-five), or any reduced instruction set computing (RISC) architecture. In aspects of the present disclosure, the instructions loaded into the general-purpose processor 102 may include code to receive a video input and a text prompt. The video input includes a sequence of video frames. The instructions loaded into the general-purpose processor 102 may also include code to extract features of the video input to generate a latent representation of the video input. The instructions loaded into the general-purpose processor 102 may also include code to inject noise to the latent representation of the video input to generate a noise injected latent. The noise is conditioned on the video input. The instructions loaded into the general-purpose processor 102 may include code to process, by an artificial neural network (ANN) model, the noise injected latent based on the text prompt to adapt the video input according to the text prompt.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
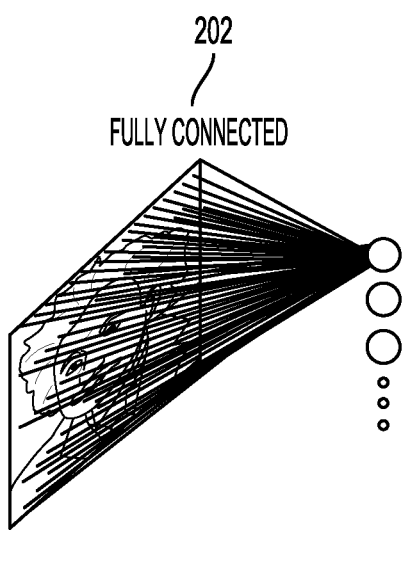
FIGS. 2A, 2B, and 2C are diagrams illustrating a neural network in accordance with aspects of the present disclosure.
Figure 2B:
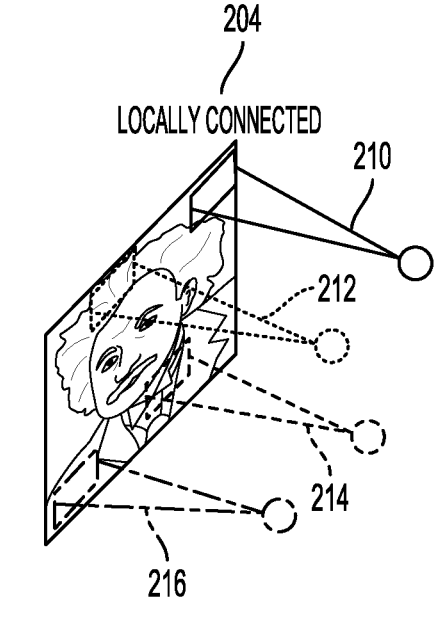

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
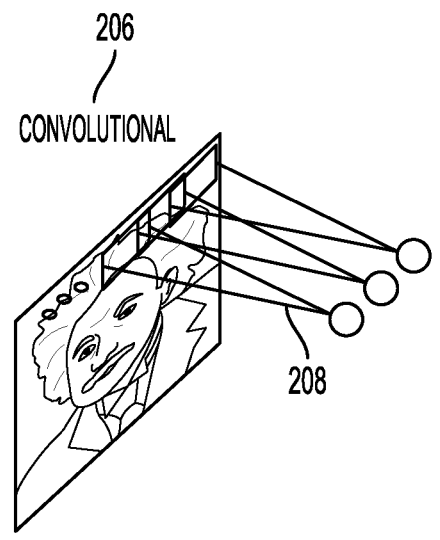

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
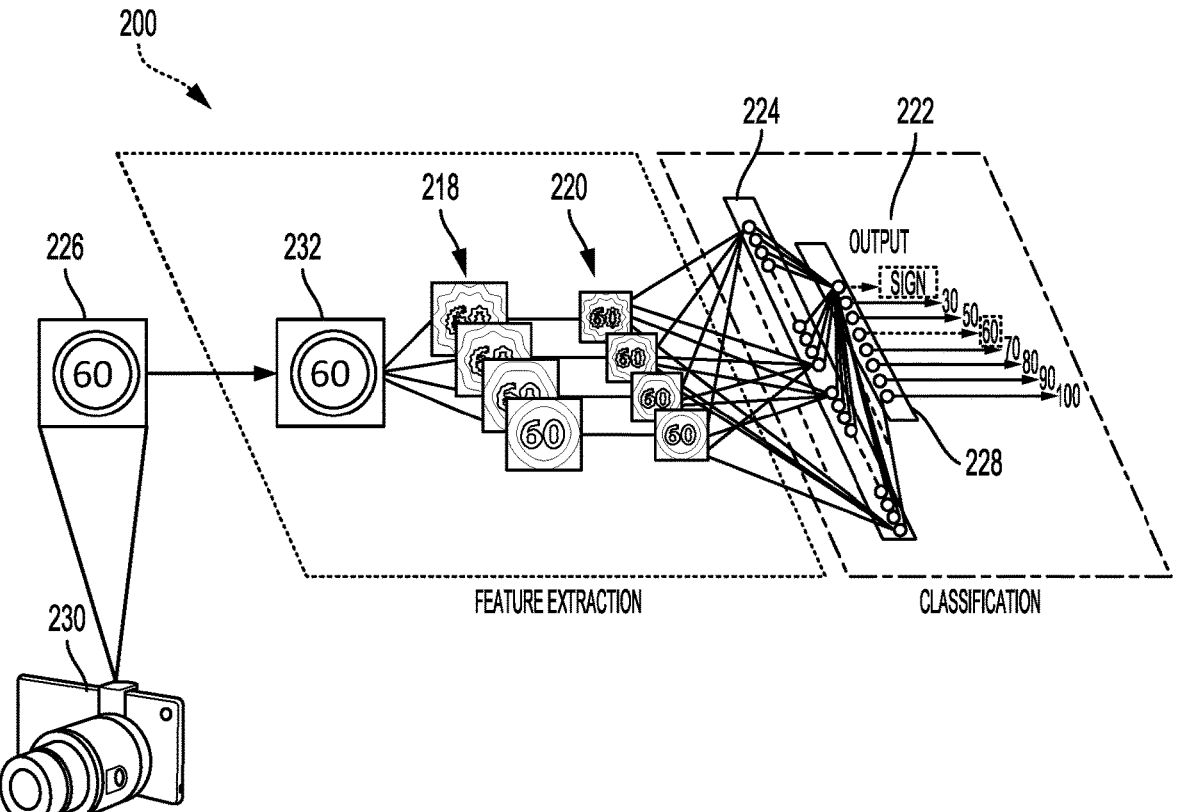
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224.

Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "backpropagation" as it involves a "backward pass" through the neural network. For example, backpropagation techniques may be used to train an ANN by iteratively adjusting weights or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images (e.g., the speed limit sign of the image 226) and a forward pass through the DCN 200 may yield an output 222 that may be considered an inference or a prediction of the DCN 200.

An optimization algorithm may be used during a training process to adjust weights and biases as needed to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model. A "dropout" technique may be used to randomly drop out some of the artificial neurons from a model during a training process, for example, in order to reduce overfitting and potentially improve the generalization of the model. An "early stopping" technique may be used to stop an on-going training process early, such as when a performance of the model using a validation dataset starts to degrade.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0, x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
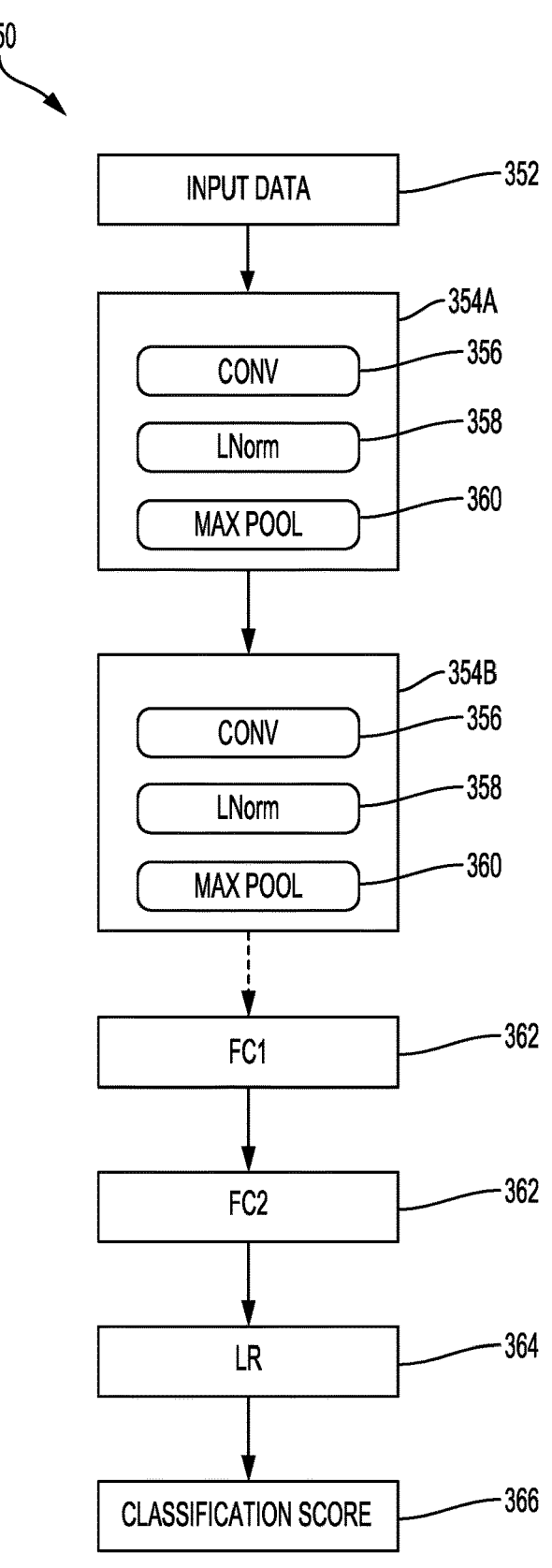
FIG. 3 is a block diagram illustrating an exemplary deep convolutional network (DCN) in accordance with aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
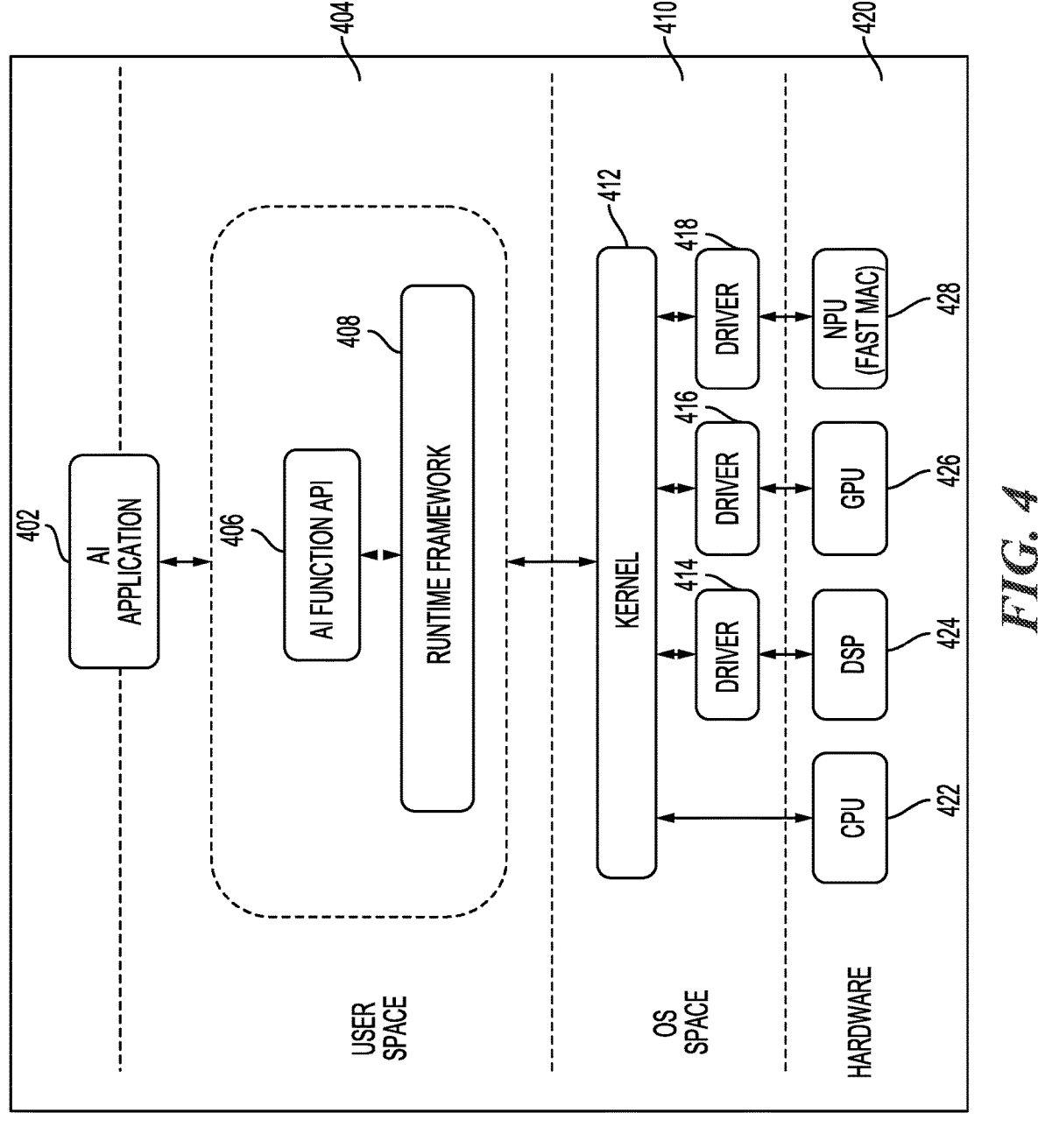
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SOC 100 of FIG. 1) to support text-based video editing for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

The run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may support text-based video editing to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

As described, aspects of the present disclosure are directed to text-based video editing based on temporally consistent inputs.

Figure 5:
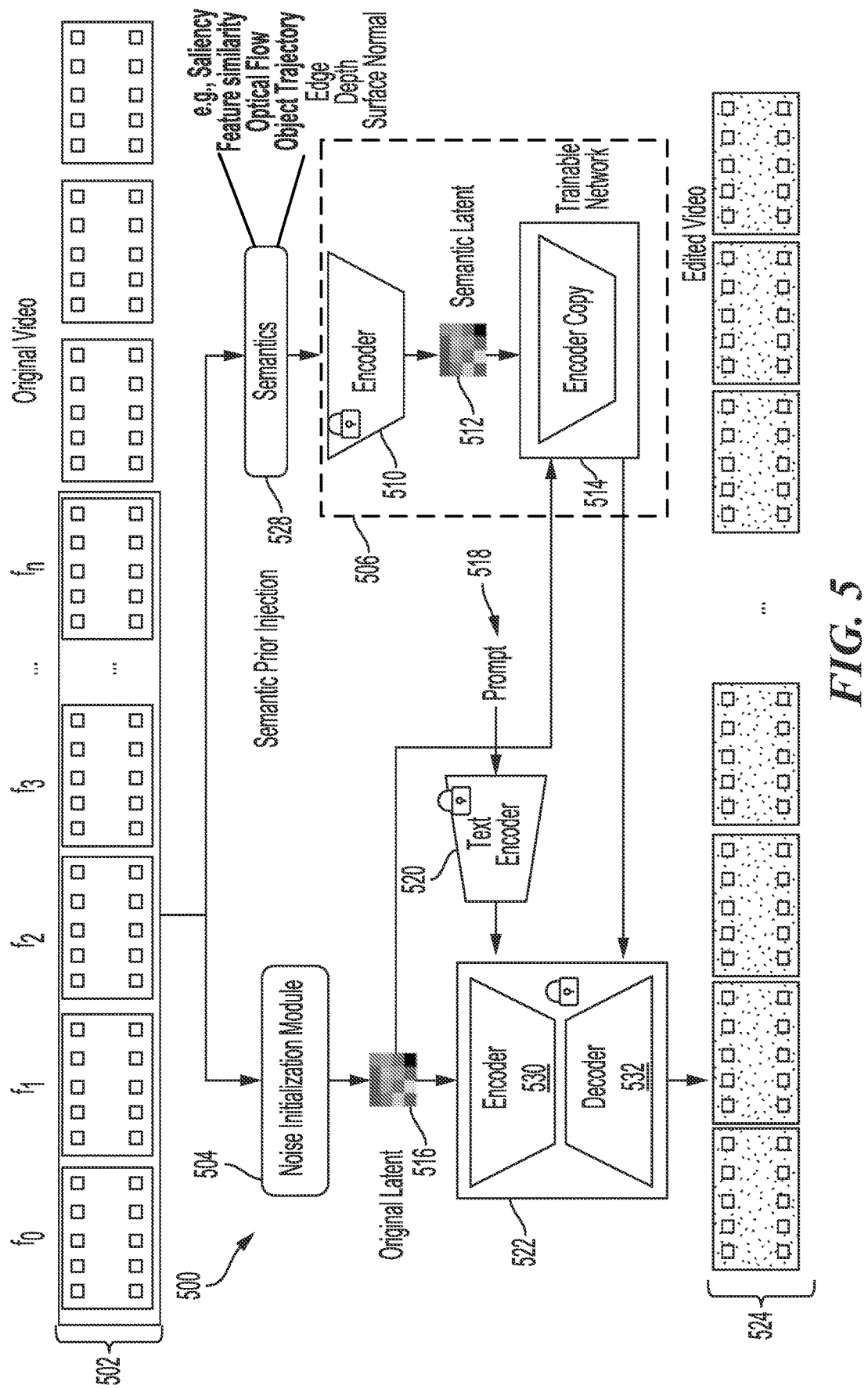
FIG. 5 is a block diagram illustrating an example architecture for text-based video editing, in accordance with various aspects of the present disclosure.

FIG. 5 is a block diagram illustrating an example architecture 500 for text-to-video editing, in accordance with various aspects of the present disclosure. Referring to FIG. 5, the example architecture 500 may include a noise initialization module 504, a semantic prior injection module 506, an encoder 510, a text encoder 520, and a text-to-video generative model 522.

The example architecture 500 may receive a video 502 and a text prompt 518. The video 502 may include a sequence of video frames $f_0$-$f_n$. Each video frame (e.g., $f_0$-$f_n$) may comprise an image. The text prompt 518 may include (but is not limited to) a sequence of characters or textual data (e.g., a sentence) or audio data, for instance. The text prompt 518 may describe a task, operation, or adaptation for one or more frames (e.g., $f_0$-$f_n$) of the video 502, for example.

The video 502 may be provided to the noise initialization module 504 and the semantic prior injection module 506. One challenge in video-to-video editing may be preserving the unchanged content and visual background in the image (e.g., portion of a video frame that is not to be adapted or modified). Preserving the unchanged content may be challenging because the text-to-image generators (e.g., text-to-video generative model 522) may be trained to synthesize an image conditioned upon the text prompt 518. To retain the unchanged part of the input video frame, the initial noise may be a noisy version of the input video frame ($f_0$-$f_n$) itself. Doing so may enable structure and content in the input video frames to be preserved in the resulting edited video 524.

Accordingly, the noise initialization module 504 may generate noise that is conditioned on the frames of the video 502. For each video frame ($f_0$-$f_n$), noise may be slowly added to produce a noisy version (e.g., noise injected latent) 516 of the video 502 that may be denoised by the text-to-video generative model 522. In various aspects, the generated noise may be added after encoding or in other words, may add to the latent representation of one or more frames of the video 502 to produce the noisy version 516 (may also be referred to as noise injected latent 516) of the video 502.

The semantic prior injection module 506 may comprise a trainable network 514 that includes a copy of an encoder of the text-to-video generative model 522. Incorporating the trainable network 514 may enable interaction across the hierarchy of the example architecture 500 at different spatial resolutions. The semantic prior injection module 506 may process the video frames ($f_0$-$f_n$) to incorporate sematic information to improve temporal consistency between the video frames. In various aspects, the semantic information may comprise (but is not limited to) saliency, feature similarity, optical flow, object trajectory, edge information (e.g., edge maps), depth information (e.g., depth maps), segmentation maps, and/or surface normal information, for example. Having incorporated the semantic information, the output of the semantic prior injection module 506 may be provided to the encoder 510. The encoder 510 may extract features of the video frames with the added semantic information to generate a semantic latent 512. The semantic latent 512 may be provided as input to the trainable network 514 along with the noise injected latent 516. The output of the trainable network 514 may be supplied to the text-to-video generative model 522 as an additional residual signal to guide the generation of the edited video 524.

The text-to-video generative model 522 may comprise an artificial neural network such as a transformer model, generative model or a large language model (LLM). The text-to-video generative model 522 may include an encoder 530 and a decoder 532. The encoder 530 may receive the noise injected latent 516. The encoder 530 may process the noise injected latent using multiple convolution layers (not shown) to produce an imageable latent which may in turn be provided to the decoder 532. The decoder 532 processes the imageable latent using a set of inverse convolution layers to generate the edited video 524 (e.g., a reconstruction of the video 502 with reduced noise).

The text-to-video generative model 522 may implement a modified cross-attention. That is, rather than comparing each frame to all of the other frames of the video 502, one or more anchor frames may be determined and employed for comparison. As such, a current frame may attend to the one or more anchor frames. The anchor frames may be, for example (but not limitation), a first frame, a previous frame, a last frame, or other identified frame(s) of the video 502. Other examples of anchor frames may include: (a) a middle frame and a previous frame of the video 502, (b) a first frame and a middle frame of the video 502, (c) a middle frame and a previous frame in a first half of the video 502, (d) a middle frame and a next frame in a second half of the video 502, (e) a first frame and a middle frame in the first half of the video 502, and (f) a middle frame and an end (last) frame in the second half of the video 502.

The text prompt 518 may be processed by a text encoder 520. The latent representation of the text prompt 518 may be provided to the text-to-video generative model 522. In turn, the text-to-video generative model 522 may use the latent representation of the text as a query to adapt one or more frames of the video 502 using the noise injected latent 516. In doing so, the text-to-video generative model 522 may perform the modified cross-attention according to the following:

$$Q^{i,j} = W^Q f_t^{i,j}; \qquad (1)$$

-continued $$K^{i,l} = W^K[f_t^{a,l}, f_t^{i-1,l}]; \quad V^{i,l} = W^v[f_t^{a,l}, f_t^{i-1,l}],$$

Where $$f_t^{i,l}$$

is the feature from the timestep i for layer 1, $$f_t^{i-1,l}$$

is the feature from the timestep $$i - 1, f_t^{a,l}$$

is the feature map from anchor frame a, and $W^Q$, $W^K$, $W^v$ respectively represent the linear weights for queries, keys and values of the attention mechanism of the text-to-video generative model 522. The operations of Equation 1 may produce the corresponding queries, keys and values $Q^{i,l}$, $K^{i,l}$, $V^{i,l}$.

The text-to-video generative model 522 may perform a generative reverse denoising process to produce the edited video 524. Having iteratively added noise to the video frames (e.g., $f_0$-$f_n$), the text-to-video generative model 522 may be trained to generate data from the noisy versions of the video frames (e.g., 516).

During training, the parameters (e.g., weights) of the encoder 530, the decoder 532, the text encoder 520 and the encoder 510 may be fixed, then the weights of the trainable network 514 may be learned according to a reconstruction loss, for example.

Figure 6A:
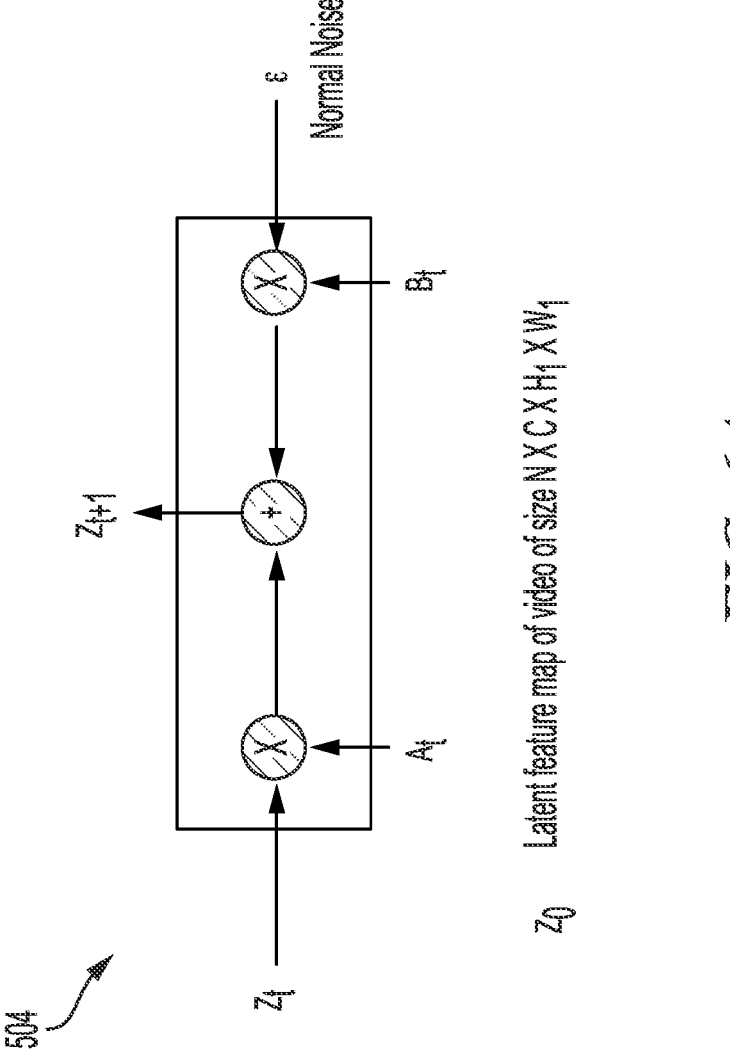
FIGS. 6A-6C are block diagrams illustrating operation of the noise initialization module of FIG. 5, in accordance with various aspects of the present disclosure.
Figure 6B:
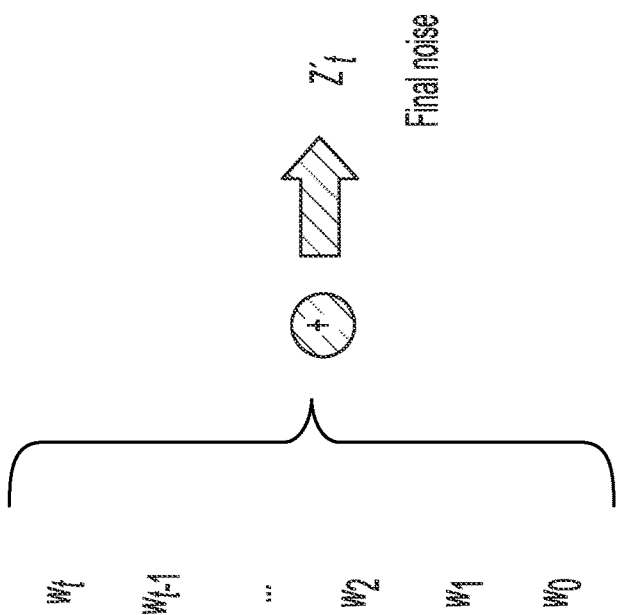
Figure 6B:
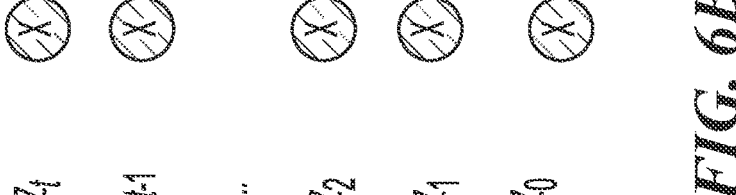
Figure 6B:
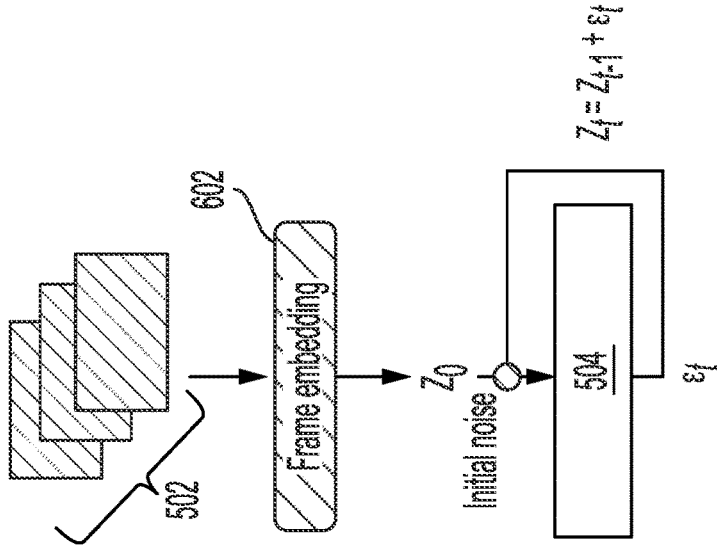
Figure 6C:
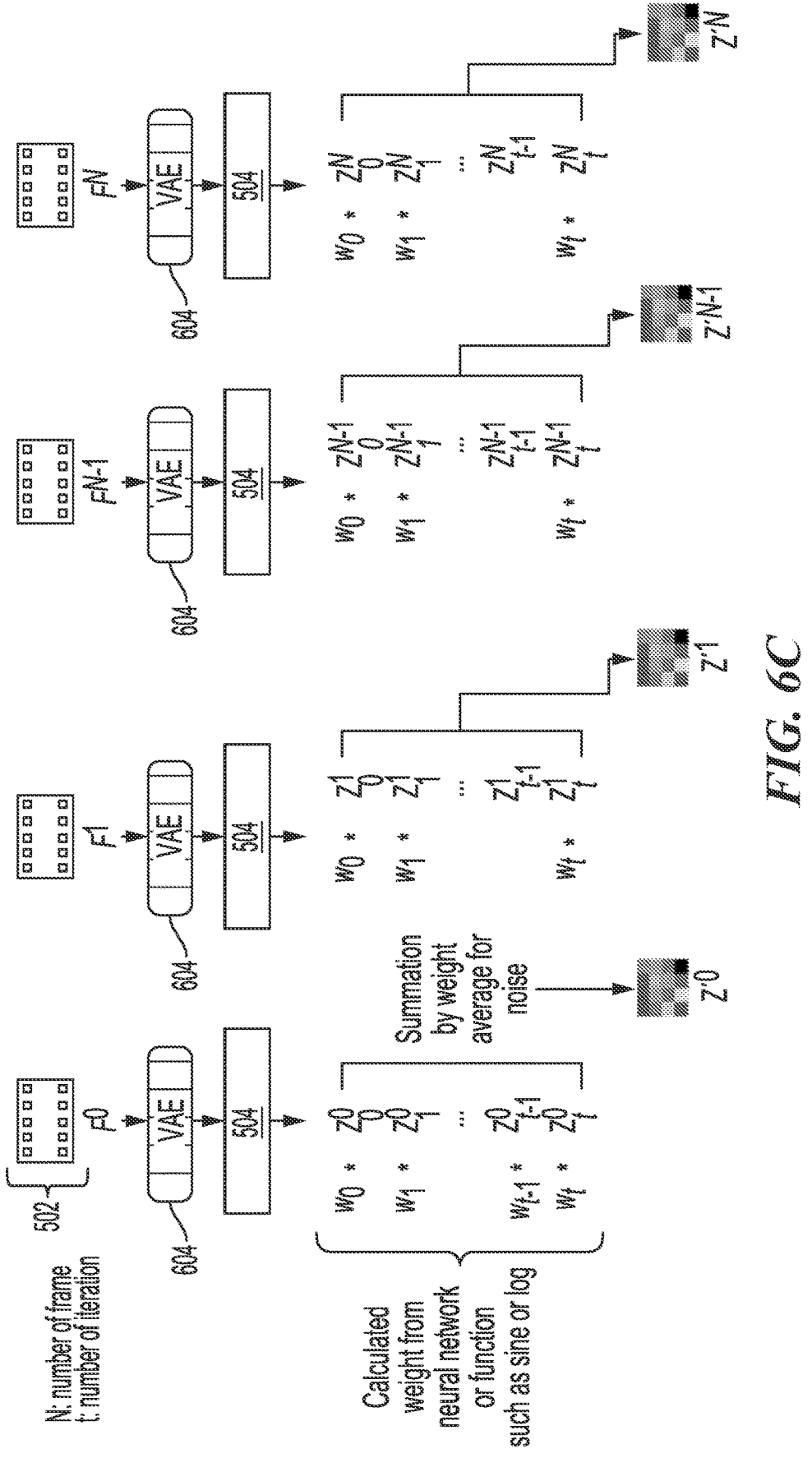

FIGS. 6A-6C are block diagrams illustrating operation of the noise initialization module 504 of FIG. 5, in accordance with various aspects of the present disclosure. Referring to FIGS. 6A, noise may be applied iteratively to a latent feature map $z_t$ to produce initial noise from which the text-to-video generative model 522 may perform the generative denoising process. A current latent $z_t$ may be received as an input. The current latent may be multiplied by a noise scheduler constant $A_t$ and added to the product of a noise scheduler constant $B_t$ and a normal noise e to recursively generate the subsequent latent feature map iteration(s) $z_{t+1}$. The noise scheduler constants ($A_t$, $B_t$) may be given by:

$$A_t = \sqrt{\frac{\alpha_{t+1}}{\alpha_t}} \qquad (2)$$

$$B_t = \sqrt{\alpha_{t+1}}\left(\sqrt{\alpha_{t+1}^{-1}} - \sqrt{\alpha_t^{-1}}\right)$$

$$\alpha_t = \prod_{i=1}^{t}(1 - \beta_i)$$

$$\beta_i \in (0, 1),$$

where t represents the number of iterations, $\propto$ and $\beta_i$ represents the mean and covariance of the noise (Gaussian noise) added to the input image, respectively.

In FIG. 6B, frames of the video 502 may be processed to a latent representation (shown as frame embedding 602).

The latent may be processed by the noise initialization module 504 to recursively generate noise. At each iteration, the latent feature map $z_t$ may be multiplied by a weight value $w_t$. By way of example (but not limitation), the weight value $w_t$ may be determined by a neural network or according to a function (e.g., 1/t, sine, or logarithmic function), for example. The weighted latent feature map $z_t$ at each iteration may, in turn be aggregated to produce the final noise injected latent $z'_t$ comprising a weighted sum. In some aspects, the aggregated weighted latent feature maps may be averaged to employ a weighted average as the final noise injected latent $z'_t$.

Referring to FIG. 6C, each frame of the video 502 may be provided to a variational autoencoder (VAE) 604. VAEs represent probabilistic generative ANN models. VAEs may include an encoder and a decoder in which the encoder maps an input to a latent space corresponding to parameters of a variational distribution and the decoder maps the latent to the input space to generate a set of data points. VAEs may be trained to minimize a reconstruction error between the encoded and decoded data and the input, in which the input is encoded as a distribution over the latent space.

The VAE 604 may process the frames of the video 502 to generate the latent representation of the frames of the video 502. The latent representation of the frames of the video 502 may be provided to the noise initialization module 504. The noise initialization module 504 may generate the weighted latent feature map at each iteration, which may be accumulated to generate a final noise injected latent $z'_t$. Unlike conventional approaches that generate noise using a different random value between zero and one for each frame over multiple iterations, with the last value being used as the noise input for a frame, the noise initialization module 504 may accumulate the noisy latent feature map information by a weighted average. Accordingly, the noise initialization module 504 may beneficially reduce lost video conditions and enable fast conversion in the generative denoising process.

Figure 7A:
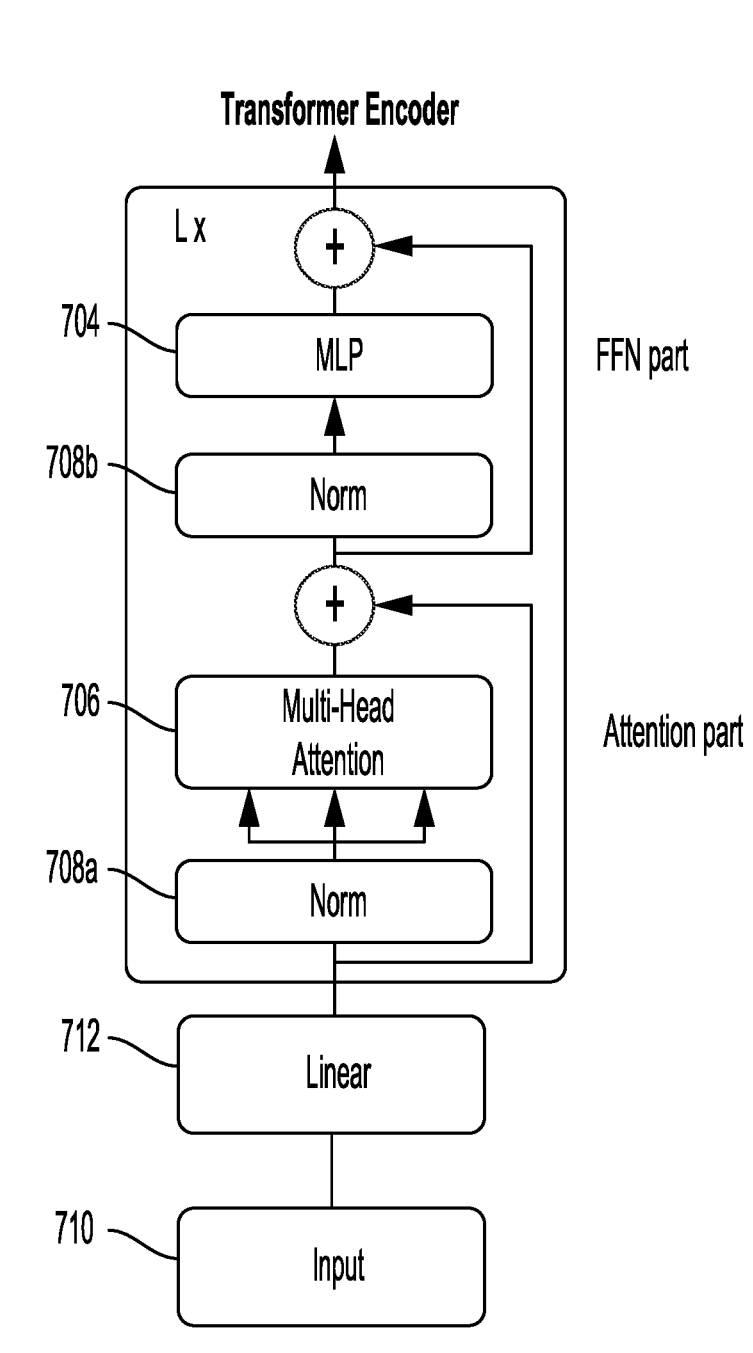
FIG. 7A is a block diagram illustrating an example transformer architecture.

FIG. 7A is a block diagram illustrating an example transformer architecture 700. The example transformer architecture 700 may include alternating layers of attention blocks 706 and multi-layer perceptron (MLP) blocks 704. A layer norm block 708 (e.g., 708a, 708b) may be applied before every block of the transformer architecture 700. The attention blocks 706 and MLP blocks 704 may each include a residual connection.

The text-to-video generative model 522 of FIG. 5 may include multiple transformer blocks such as the example transformer architecture 700. Each transformer block may include a self-attention layer, which processes the feature map of the current frame.

The example transformer architecture 700 may receive an input such as sequential data 710. In some examples, the sequential data 710 may include (but is not limited to) a text prompt (e.g., text prompt 518) or image data such as frames of the video 502. The transformer architecture 700 may divide the input (e.g., sequential data 710) into portions or tokens (e.g., words or image patches).

The tokens may be further processed for example, via a linear layer 712, which generates a sequence of linear embeddings. In some aspects, positional embeddings may be added to the linear embeddings to generate tokens with positional embeddings. The linear embeddings may be normalized via the layer norm block 708 and provided to the attention block 706.

The attention block 706 may implement self-attention or multi-head attention to determine relationships among the embeddings for each token. In various aspects, the attention block 706 may apply the modified cross-attention to the inputs. Accordingly, the attention block 706 may assign different attention weights to different portions of the sequence of embeddings corresponding to the tokens. The output of the attention block 706 may be provided to the MLP block 704 and processed to generate an output inference such as a classification, for example.

Figure 7B:
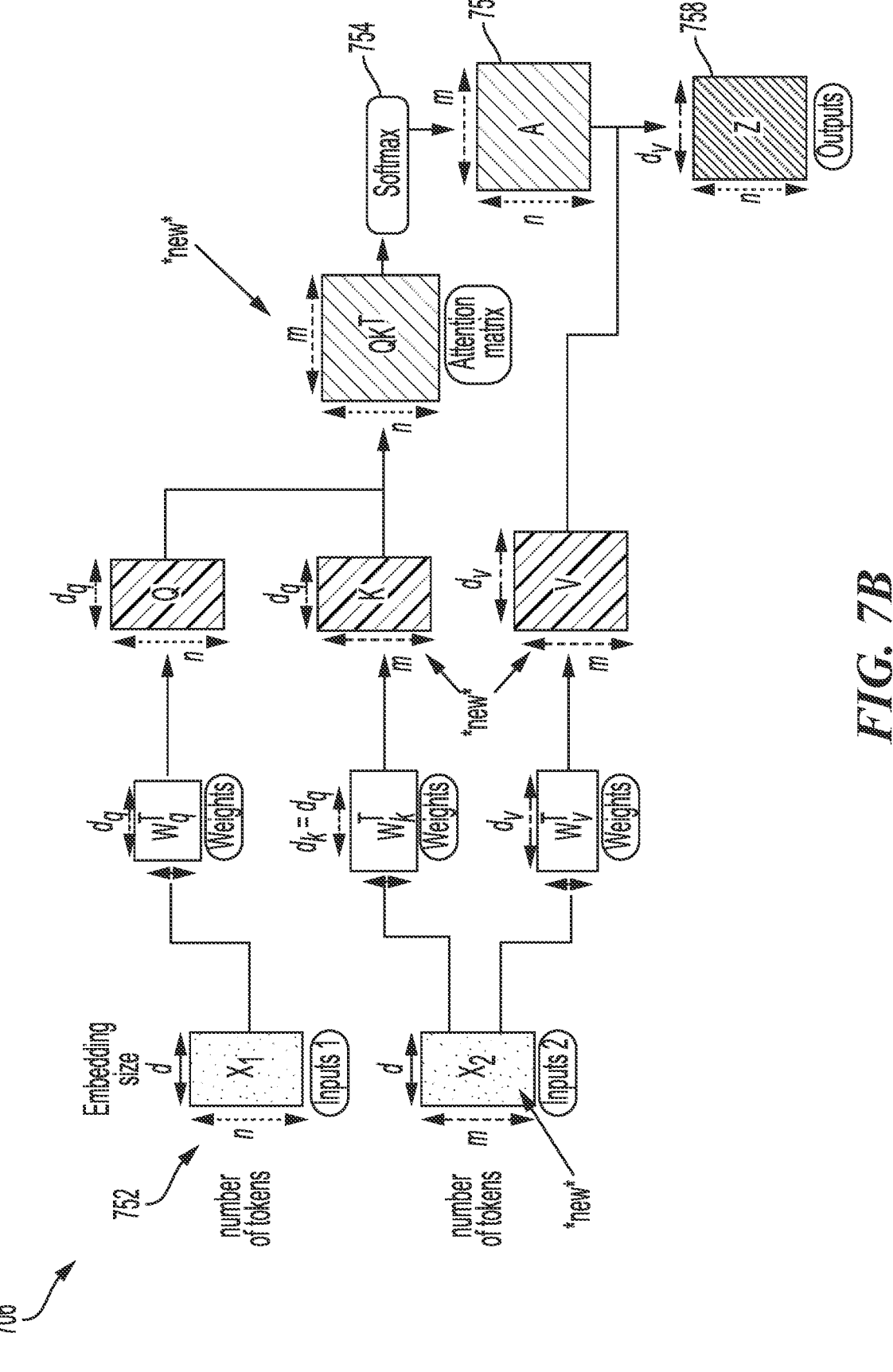
FIG. 7B is a block diagram illustrating an example attention block, in accordance with various aspects of the present disclosure.

FIG. 7B is a block diagram illustrating an example attention block 706, in accordance with various aspects of the present disclosure. Referring to FIG. 7B, the attention block 706 may receive a frame of a video $x_1$ as an input. The attention block 706 may be configured to attend to features of different frames. Consider that the current frame has a feature map 752 of size C×H×W, where C, H and W represent the channel, the height and the width of the feature map, respectively. The feature map 752 may be patchified and flattened to form tokens, which may be aggregated to produce anchor frame tokens $f_i$ of size n×d, where n is the height of the patch and d is the width of the patch. The token vectors may be provided to the attention block 706. As shown in FIG. 7B, an input frame $x_1$ (e.g., current frame) may attend to one or more anchor frames $x_2$ (e.g., first frame, last frame, or other frame(s)). A weight $$W_q^T$$

may be applied to the input frame $x_1$ to generate a query Q. In some aspects, the anchor frames may be concatenated together as $x_2 = f_a \copyright f_b \copyright f_c \ldots f_z$ where $\copyright$ is the concatenation operation, $f_a$, $f_b$, and $f_c$ are different anchor frame tokens such as a previous frame, middle frame, last frame, and first frame. Weights $$W_k^T$$

may be applied to the anchor frame $x_2$ to generate a set of keys K, and weights $$W_v^T$$

may be applied to the anchor frame $x_2$ to generate a set of values V. The attention block 706 may generate an attention matrix $QK^T$ based on the query Q and the keys K. A softmax function 754 may be applied to generate an attention map A 756 as an output. The attention map A 756 may have a size n=m, where m is the sum of all the number of tokens in $f_a$, $f_b$, $f_c$, The attention map A 756 may be applied values V to generate an output Z 758.

Figure 8:
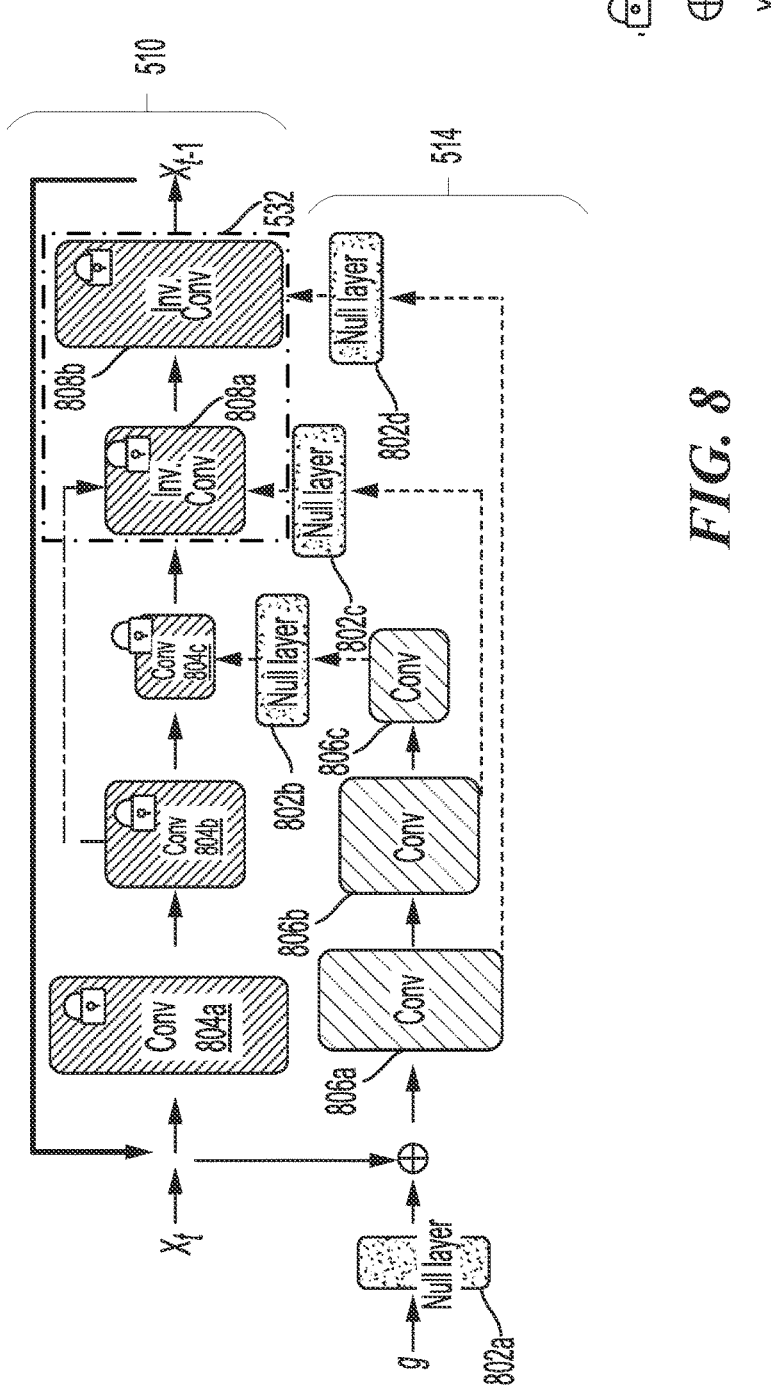
FIG. 8 is a block diagram illustrating an example architecture of the semantic prior injection module, in accordance with aspects of the present disclosure.

FIG. 8 is a block diagram illustrating an example architecture of the semantic prior injection module 506 of FIG. 5. Referring to FIG. 8, the semantic prior injection module 506 may receive a latent representation of a current frame $x_r$. The semantic information (e.g., 528 of FIG. 5) including (but not limited to) saliency information, optical flow, segmentation map, edge information, etc. may be injected into the latent representation of the current frame $x_r$. In turn, the current frame $x_r$ may be processed using the successive convolution layers 804a-c to generate a semantic latent (e.g., 512 of FIG. 5).

In some aspects, each of the convolution layers 804a-c of encoder 510 may successively down-sample the current frame $x_r$. Similarly, each of the convolution layer 806a-c of the trainable network 514 may successively down-sample the semantic guidance g (may also be referred to as "semantic latent"). For semantic guidance, the trainable network 514 takes as input a latent representation of the current video frame $x_r$.

The semantic prior injection module 506 may also include one or more null layers 802a-d. The null layers 802a-d may comprise convolution layers 806a-c of the trainable network 514 for which weight values may be initialized to zero. The convolution layers 806a-c of the trainable network 514 may be arranged to provide output features of the semantic latent 512 at increasingly lower spatial resolution to a corresponding null layer (e.g., 802b-802d). Prior to training, the effect of semantic guidance g (e.g., 512) may be nullified. Then after the semantic prior injection module 506 is trained, null layer 802a-d may include trainable weights of the trainable network 514. The output of the null layers 802a-d may be a feature map that may be provided to inverse convolution layers 808a-b of the decoder 532 of FIG. 5 to process the semantic latent 512. Inverse convolution layers 808a-b may be configured to decode the latent representation of the current frame at increasing spatial resolutions guided by the corresponding features of the semantic latent.

Accordingly, aspects of the present disclosure may enable the capture of inductive biases related to the input video 502 in the generation process of a text-to-video generative model 522. The initialization provided by the noise initialization module 504 may also enable faster convergence, because the starting signal is conditioned upon the input video 502 rather than conventional approaches that use random noise.

Moreover, aspect of the present disclosure may enable edge deployment because frames may be processed sequentially and may enable long video generation. Furthermore, guidance may be incorporated for any combination of anchor frames. The injection of semantic guidance using the trainable network 514 may be used in conjunction with the input video 502 to ensure semantic and temporal consistency in the generated video.

FIG. 9 is a flow diagram illustrating a processor-implemented method 900 for text-based video editing, in accordance with various aspects of the present disclosure. The processor-implemented method 900 may be performed by one or more processors such as the CPU (e.g., 102, 422), GPU (e.g., 104, 426), and/or other processing unit (e.g., DSP 424, NPU 428), for example.

At block 902, the one or more processors receive a video input and a text prompt. The video input includes a sequence of video frames. As described for instance with reference to FIG. 5, the example architecture 500 may receive a video 502 and a text prompt 518. The video 502 may include a sequence of video frames $f_0$-$f_n$. Each video frame (e.g., $f_0$-$f_n$) may comprise an image. The text prompt 518 may include (but is not limited to) a sequence of characters or textual data (e.g., a sentence) or audio data, for instance. The text prompt 518 may describe a task, operation, or adaptation for one or more frames (e.g., $f_0$-$f_n$) of the video 502, for example.

At block 904, the one or more processors extract features of the video input to generate a latent representation of the video input. For example, as described with reference to FIG. 6C, each frame of the video 502 may be provided to a variational autoencoder (VAE) 604. The VAE 604 may process the frames of the video 502 to generate the latent representation of the frames of the video 502.

At block 906, the one or more processors inject noise to the latent representation of the video input to generate a noise injected latent, the noise being conditioned on the video input. As described, for instance, with reference to FIG. 5, the latent representation of the video frames may be provided to the noise initialization module 504 and the semantic prior injection module 506. The noise initialization module 504 may generate noise that is conditioned on the frames of the video 502. For each video frame ($f_0$-$f_n$), noise may be slowly added to produce a noisy version (e.g., noise injected latent) 516 of the video 502 that may be denoised by the text-to-video generative model 522.

At block 908, the one or more processors processing, by an artificial neural network (ANN) model, the noise injected latent based on the text prompt to adapt the video input according to the text prompt. For example, as described with reference to FIG. 5, the text-to-video generative model 522 may implement a modified cross-attention. That is, rather than comparing each frame to all of the other frames of the video 502, one or more anchor frames may be determined and employed for comparison. As such, a current frame may attend to the one or more anchor frames. The anchor frames may be, for example (but not limitation), a first frame, a previous frame, a last frame, or other identified frame(s) of the video 502. Other examples of anchor frames may include: (a) a middle frame and a previous frame of the video 502, (b) a first frame and a middle frame of the video 502, (c) a middle frame and a previous frame in a first half of the video 502, (d) a middle frame and a next frame in a second half of the video 502, (e) a first frame and a middle frame in the first half of the video 502, and (f) a middle frame and an end (last) frame in the second half of the video 502.

The text prompt 518 may be processed by a text encoder 520. The latent representation of the text prompt 518 may be provided to the text-to-video generative model 522. In turn, the text-to-video generative model 522 may use the latent representation of the text as a query to adapt one or more frames of the video 502 using the noise injected latent 516.

Implementation examples are provided in the following numbered clauses.

1. An apparatus, comprising:
   at least one memory; and
   at least one processor coupled to the at least one memory, the at least one processor configured to:
   receive a video input and a text prompt, the video input including a sequence of video frames;
   extract features of the video input to generate a latent representation of the video input;
   inject noise to the latent representation of the video input to generate a noise injected latent, the noise being conditioned on the video input; and
   process, by an artificial neural network (ANN) model, the noise injected latent based on the text prompt to adapt the video input according to the text prompt.

2. The apparatus of clause 1, in which the ANN performs a generative denoising to generate the adapted video input.

3. The apparatus of clause 1 or 2, in which ANN applies a cross-attention of a first video frame to one or more anchor frames.

4. The apparatus of any of clauses 1-3, in which the at least one processor is further configured to:
   inject semantic information into one or more frames of the video input for a sematic injected video;

extract features of the sematic injected video to generate a semantic latent; and
   guiding an adaptation of the video input based on the semantic latent.

5. The apparatus of any of clauses 1-4, in which the noise injected latent is generated recursively based on a weighted sum of noisy latent vectors.

6. The apparatus of any of clauses 1-5, in which a weight applied to each latent is determined according to a function or a neural network model.

7. The apparatus of any of clauses 1-6, in which the ANN comprises a generative neural network model.

8. A processor-implemented method performed by at least one processor, the processor-implemented method comprising:
   receiving a video input and a text prompt, the video input including a sequence of video frames;
   extracting features of the video input to generate a latent representation of the video input;
   injecting noise to the latent representation of the video input to generate a noise injected latent, the noise being conditioned on the video input; and
   processing, by an artificial neural network (ANN) model, the noise injected latent based on the text prompt to adapt the video input according to the text prompt.

9. The processor-implemented method of clause 8, in which the ANN performs a generative denoising to generate the adapted video input.

10. The processor-implemented method of clause 8 or 9, in which the ANN applies a cross-attention of a first video frame to one or more anchor frames.

11. The processor-implemented method of any of clauses 8-10, further comprising:
   injecting semantic information into one or more frames of the video input for a sematic injected video;
   extracting features of the sematic injected video to generate a semantic latent; and
   guiding an adaptation of the video input based on the semantic latent.

12. The processor-implemented method of any of clauses 8-11, in which the noise injected latent is generated recursively based on a weighted sum of noisy latent vectors.

13. The processor-implemented method of any of clauses 8-12, in which a weight applied to each latent is determined according to a function or a neural network model.

14. The processor-implemented method of any of clauses 8-13, in which the ANN comprises a generative neural network model.

15. An apparatus, comprising:
   means for receiving a video input and a text prompt, the video input including a sequence of video frames;
   means for extracting features of the video input to generate a latent representation of the video input;
   means for injecting noise to the latent representation of the video input to generate a noise injected latent, the noise being conditioned on the video input; and
   means for processing, by an artificial neural network (ANN) model, the noise injected latent based on the text prompt to adapt the video input according to the text prompt.

16. The apparatus of clause 15, in which the ANN performs a generative denoising to generate the adapted video input.

17. The apparatus of clause 15 or 16, in which the ANN applies a cross-attention of a first video frame to one or more anchor frames.

18. The apparatus of any of clauses 15-17, further comprising:

means for injecting semantic information into one or more frames of the video input for a sematic injected video;

means for extracting features of the sematic injected video to generate a semantic latent; and means for guiding an adaptation of the video input based on the semantic latent.

19. The apparatus of any of clauses 15-18, in which the noise injected latent is generated recursively based on a weighted sum of noisy latent vectors.

20. The apparatus of any of clauses 15-19, in which a weight applied to each latent is determined according to a function or a neural network model.

In one aspect, the receiving means, extracting means, injecting means and/or processing means may be the CPU 102, program memory associated with the CPU 102, NPU 108, the dedicated memory block 118, fully connected layers 362, NPU 428 and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An apparatus, comprising:

at least one memory; and at least one processor coupled to the at least one memory, the at least one processor configured to:

receive a video input and a text prompt, the video input including a sequence of video frames;

extract features of the video input to generate a latent representation of the video input;

inject noise to the latent representation of the video input to generate a noise injected latent, the noise injected latent being generated recursively based on a weighted sum of noisy latent vectors, the noise being conditioned on frames of the video input;

process, by an artificial neural network (ANN) model, the noise injected latent based on the text prompt to adapt the video input according to the text prompt using fixed parameters of the ANN model; and generate an adapted video output maintaining temporal consistency across the sequence of video frames.

2. The apparatus of claim 1, in which the ANN performs a generative denoising to generate the adapted video input.

3. The apparatus of claim 1, in which ANN applies a cross-attention of a first video frame to one or more anchor frames.

4. The apparatus of claim 1, in which the at least one processor is further configured to:

inject semantic information into one or more frames of the video input for a semantic injected video;

extract features of the semantic injected video to generate a semantic latent; and guiding an adaptation of the video input based on the semantic latent.

5. The apparatus of claim 1, in which a weight applied to each latent is determined according to a function or a neural network model.

6. The apparatus of claim 5, in which the ANN comprises a generative neural network model.

7. A processor-implemented method performed by at least one processor, the processor-implemented method comprising:

receiving a video input and a text prompt, the video input including a sequence of video frames;

extracting features of the video input to generate a latent representation of the video input;

injecting noise to the latent representation of the video input to generate a noise injected latent, the noise injected latent being generated recursively based on a weighted sum of noisy latent vectors, the noise being conditioned on frames of the video input;

processing, by an artificial neural network (ANN) model, the noise injected latent based on the text prompt to adapt the video input according to the text prompt using fixed parameters of the ANN model; and generating an adapted video output maintaining temporal consistency across the sequence of video frames.

8. The processor-implemented method of claim 7, in which the ANN performs a generative denoising to generate the adapted video input.

9. The processor-implemented method of claim 7, in which the ANN applies a cross-attention of a first video frame to one or more anchor frames.

10. The processor-implemented method of claim 7, further comprising:

injecting semantic information into one or more frames of the video input for a semantic injected video;

extracting features of the semantic injected video to generate a semantic latent; and guiding an adaptation of the video input based on the semantic latent.

11. The processor-implemented method of claim 7, in which a weight applied to each latent is determined according to a function or a neural network model.

12. The processor-implemented method of claim 11, in which the ANN comprises a generative neural network model.

13. An apparatus, comprising:

means for receiving a video input and a text prompt, the video input including a sequence of video frames;

means for extracting features of the video input to generate a latent representation of the video input;

means for injecting noise to the latent representation of the video input to generate a noise injected latent, the noise injected latent being generated recursively based on a weighted sum of noisy latent vectors, the noise being conditioned on frames of the video input;

means for processing, by an artificial neural network (ANN) model, the noise injected latent based on the text prompt to adapt the video input according to the text prompt using fixed parameters of the ANN model; and means for generating an adapted video output maintaining temporal consistency across the sequence of video frames.

14. The apparatus of claim 13, in which the ANN performs a generative denoising to generate the adapted video input.

15. The apparatus of claim 13, in which the ANN applies a cross-attention of a first video frame to one or more anchor frames.

16. The apparatus of claim 13, further comprising:

means for injecting semantic information into one or more frames of the video input for a semantic injected video;

means for extracting features of the semantic injected video to generate a semantic latent; and means for guiding an adaptation of the video input based on the semantic latent.

17. The apparatus of claim 13, in which a weight applied to each latent is determined according to a function or a neural network model.

* * * * *